United States Patent [19]

Bjorklund

[11] 4,270,561
[45] Jun. 2, 1981

[54] VALVE FOR A BURNER SYSTEM

[76] Inventor: Curt A. Bjorklund, Box 99, Ulricehamn, Sweden

[21] Appl. No.: 2,327

[22] Filed: Jan. 10, 1979

Related U.S. Application Data

[63] Continuation-in-part of Ser. No. 481,841, Jun. 21, 1974, Pat. No. 3,987,810, Ser. No. 204,623, Dec. 3, 1971, abandoned, and Ser. No. 702,076, Jul. 2, 1976, abandoned.

[30] Foreign Application Priority Data

Dec. 7, 1970 [DE] Fed. Rep. of Germany ....... 7045109 [U]
Mar. 17, 1971 [SE] Sweden .............................. 3410/71

[51] Int. Cl.³ ...................... F23D 11/28; F16K 11/00
[52] U.S. Cl. .................................. 137/107; 251/129; 431/121
[58] Field of Search ................ 137/107; 251/129, 141; 431/30, 121; 239/110, 111

[56] References Cited

U.S. PATENT DOCUMENTS

| 1,891,835 | 12/1932 | Perry | 251/139 |
|---|---|---|---|
| 2,494,778 | 1/1950 | Plass | 431/121 X |
| 2,575,850 | 11/1951 | Swickard | 251/129 X |
| 2,627,544 | 2/1953 | Eck | 251/129 X |
| 2,685,919 | 8/1954 | Plass et al. | 431/121 X |
| 2,689,001 | 9/1954 | Leysen | 431/121 X |
| 3,339,574 | 9/1967 | Erb et al. | 137/107 X |
| 3,358,928 | 12/1967 | Melendy | 137/107 X |
| 3,606,905 | 9/1971 | Fehler | 137/107 |

Primary Examiner—Daniel M. Yasich
Attorney, Agent, or Firm—Robert E. Burns; Emmanuel J. Lobato; Bruce L. Adams

[57] ABSTRACT

A valve for incorporation in a fuel line, between a pump and a fuel burner, has a valve chamber and a valve member in the chamber. The valve member normally closes a connection from the pump to the burner, but opens this connection in response to a suitably raised pump discharge pressure. Means are provided whereby, upon the shutting off of such pump discharge pressure, the valve, by magnetic action not only closes but momentarily causes fuel to be drawn from the line to the burner, to prevent fuel from dripping out of the burner and from thereby causing smell, spillage or clogging of the burner.

2 Claims, 9 Drawing Figures

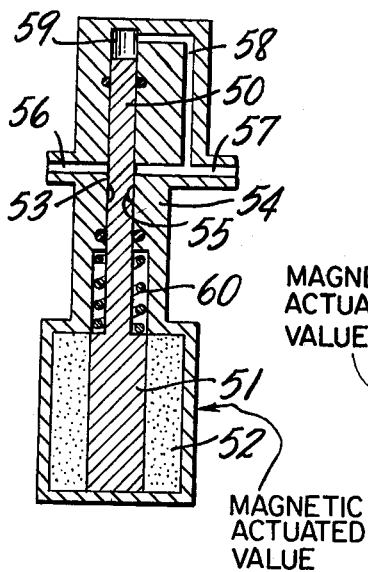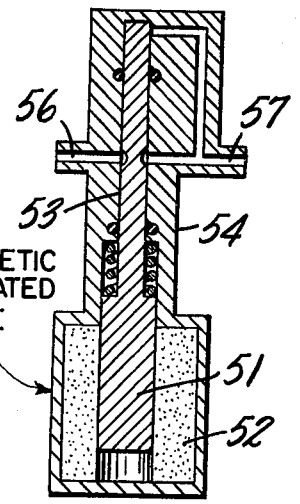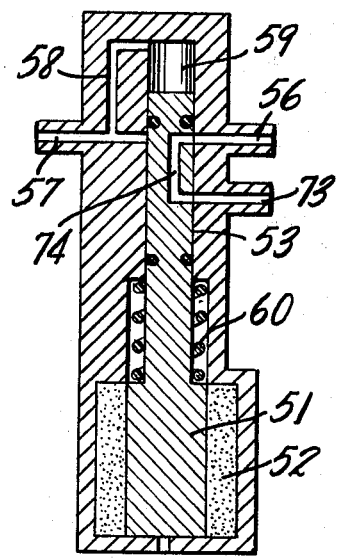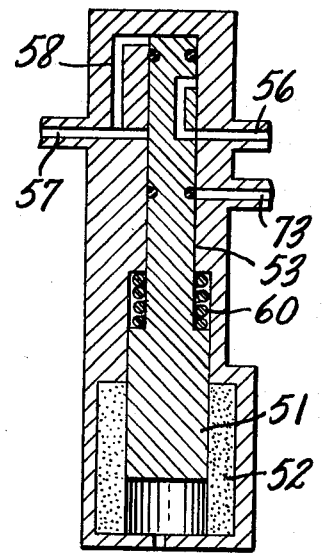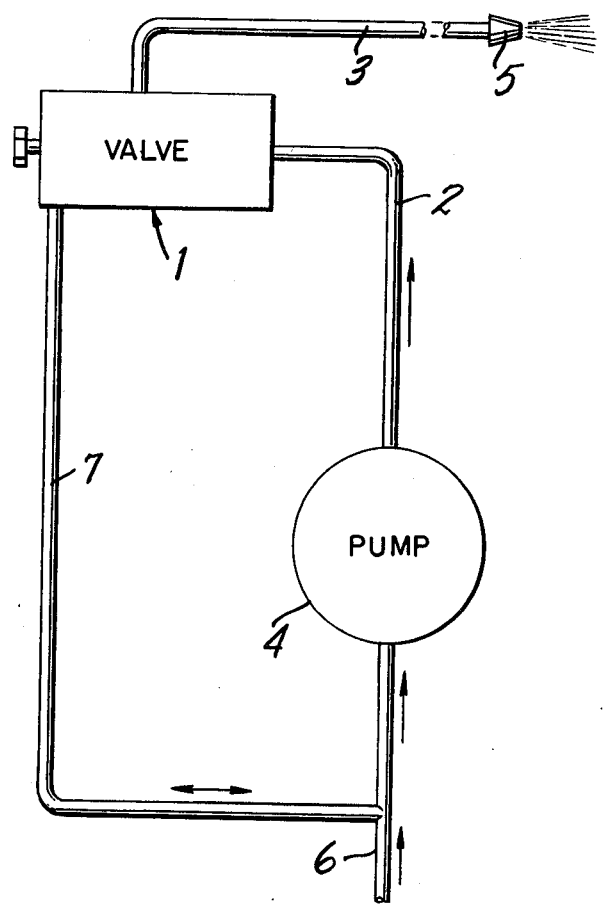

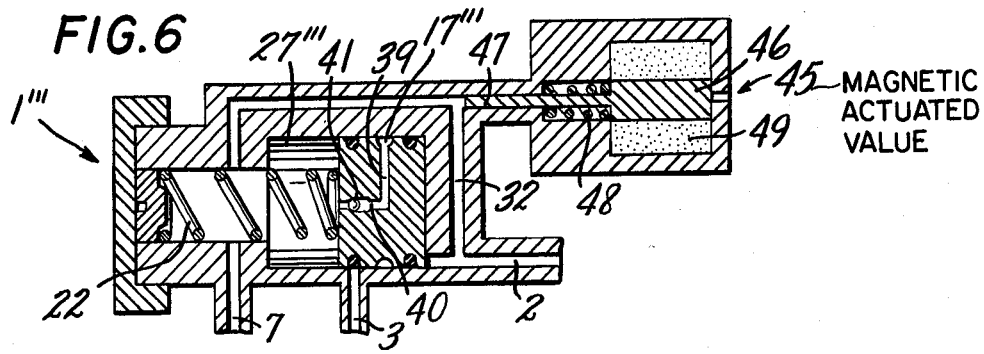
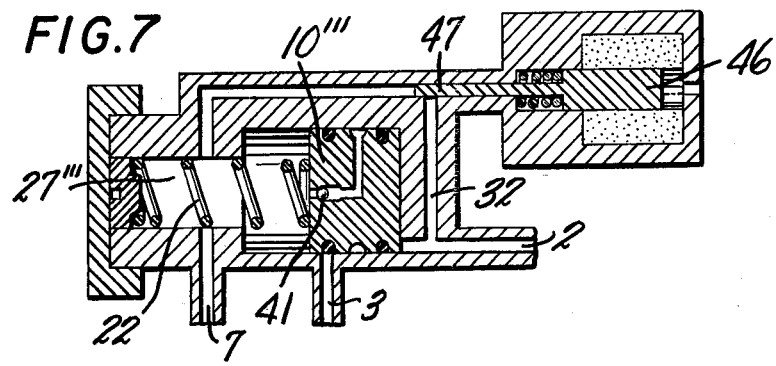
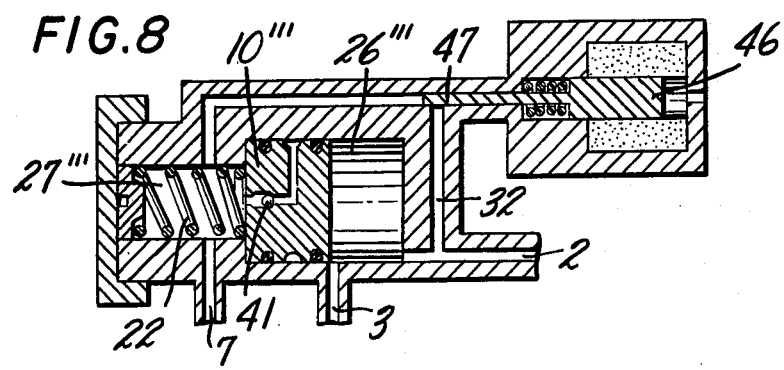
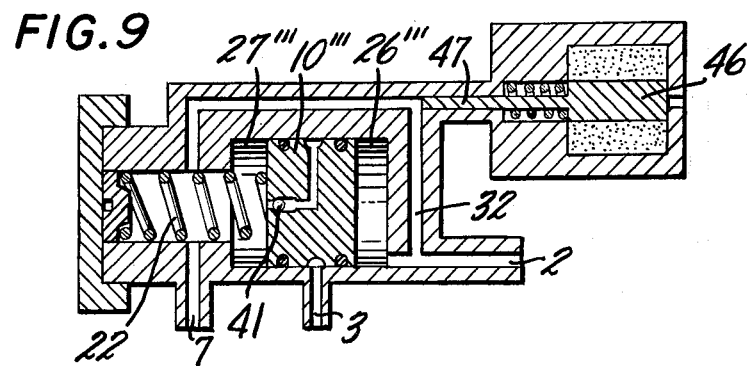

VALVE FOR A BURNER SYSTEM

BACKGROUND OF THE INVENTION

This is a continuation in part application of application Ser. No 481,841, filed June 21, 1974, now U.S. Pat. No. 3,987,810, a continuation-in-part of application Ser. No 204,623, filed Dec. 3, 1971, now abandoned and a continuation-in-part of application Ser. No. 702,076, filed July 2, 1976 and now abandoned.

A disadvantage of known valves for incorporation into a burner supply line is that they allow oil in the burner supply pipe to drip from the burner, when the supply of oil has been turned off. This dripping causes the formation of soot and the adhesion thereof to the burner parts and parts of the heating boiler. It also creates a smell of oil in the vicinity of the burner. Severe carbon deposit on electrodes of the burner can cause electrical flashovers. As a result of the increased soot formation and deposit, the burner nozzle can bring about poor distribution of the heating flame, whereby the efficiency of the burner is reduced.

These disadvantages have already been noted earlier, and it has been found that sucking back of oil from the burner nozzle is a step on the way to solution of said problems. Accordingly it has been proposed to use the returning of the valve piston or of a special auxiliary piston, moved by the oil pressure to a working position, for sucking back oil from the burner line. However, it is a part of all such proposals, without exception in any way, that the end of the valve chamber which is remote from the pump line, and the entire end surface of the piston situated in that area, are used for producing a vacuum in the burner line which is connected to said chamber end at the piston's return to its initial position. The result of this is that if not the whole burner line when at least a substantial part of the same is emptied of oil and filled with air. This air has again to be expelled out of the apparatus, when the burner starts, and the result will be a rattling, popping, puffing and sooting burner start, which in addition thereto will be relatively slow due to a low start pressure resulting in an unsufficient spreading of oil at the nozzle. In the same way the end of combustion will be accompanied by sooting and dripping after, as these conventional valves are not capable to sufficiently quickly and with sufficient suction power cut off the oil supply. The object and the way of working of the previously known valves is limited to remove oil from the burner nozzle and the burner line in a very general way; thereby the disadvantages mentioned above are incurred.

An object of the present invention is to provide a valve which can be incorporated in a supply line to a burner and which obviates or minimizes these troubles.

SUMMARY OF THE INVENTION

The invention provides a valve for incorporation into a fuel line for example between an oil pump and a burner, comprising a valve chamber having a movable valve member, connections to an oil supply and to an outlet to a burner or the like, and means connectable to this outlet for providing a vacuum chamber, wherein a pressure lower than that in the outlet prevails during closing stroke of the movable valve member, so that a certain quantity of fuel is sucked back from the outlet. The term "vacuum chamber," as used herein, includes a chamber, aperture, space, channel, or duct wherein a reduced pressure, particularly a sub-atmospheric pressure can be maintained at a proper time.

BRIEF DESCRIPTION OF THE DRAWINGS

FIG. 1 is a diagram of a burner system including a solenoid-operated valve according to the present invention;

FIGS. 2 and 3 show a first, solenoid-operated valve according to the invention, in a position of rest and a working position, respectively;

FIGS. 4 and 5 show a second such valve in corresponding positions; and

FIGS. 6 to 9 show a third embodiment of the invention, with a solenoid-controlled valve, in four different positions thereof.

DESCRIPTION OF THE PREFERRED EMBODIMENTS

In FIG. 1 a valve 1, conforming to the invention, is connected by valve inlet and outlet pipes or lines 2 and 3, respectively, to a pump discharge section of a pump 4, and to a burner 5. The pump 4 has a suction inlet connected by a line 6 to, for example, an oil tank (not shown). The pump 4 has a suction inlet connected by a line 6 to, for example, an oil tank (not shown). The pump has a discharge outlet connected to the valve inlet by the line or pipe 2. Extending between the suction line 6 and the valve 1 is an oil return line 7 which, together with the pump 4 and its discharge line 2, allows a circulaton in both directions between valve 1 and pump 4.

As shown in FIGS. 6 to 9, the housing of valve 1 defines a continuous cylindrical chamber having ends shown at right and left, respectively. A main piston 10''' having first and second (left and right) end portions is slideably mounted in the chamber.

Between the two piston end portions an annular vacuum chamber 17''' is arranged, according to the invention. This chamber communicates, in certain positions of the piston (FIGS. 6-7) with the burner line 3 and in other positions (FIGS. 8-9) with an evacuation channel 39.

In this embodiment of valve 1 (FIGS. 6 to 9) there occurs a delay, controlled from the outside, by means of a magnetic solenoid valve 45. This delay determines the duration of the preliminary blowing operation. Other means can replace the magnet. The suction or pressure of the burner fan (not shown) can also bring about the delay.

In the drawings, a bypass channel 32 is branched off from the pump line 2 upstream of the end of this line which discharges into the valve chamber. Connected to the channel 32 is the solenoid valve 45, whose core 46 has an extension, in the channel 32, constituting a piston 47 which opens the channel when the solenoid coil 49 is de-energized, being held back by a return spring 48. The main piston 10''' is provided with evacuation channel 39 connected to a small chamber 40 in the piston or valve member, with a hydraulically operable check valve or ball valve 41 in this chamber.

In the rest position shown in FIG. 6 the pump line 2 is connected via the unblocked bypass channel 32 to a chamber part 27'''. The pump inlet to the valve chamber and the burner line 3 are blocked by the main piston. When the pump 4 starts, a time-controlled preliminary blowing operation is started at the burner 5, by conventional means (not shown). Hydrostatic pressure acts on the right end of the main piston 10''' but the main piston return spring 22 produces such a counterpressure that the main piston remains in the initial position, while oil flows into the return line 7 via the bypass channel and the chamber part 27'''.

Switch means (not shown) then energize solenoid coil 49 (FIG. 7). The solenoid valve 45 then blocks the bypass channel 32; the return spring 48 is compressed. Upon the resulting piston movement towards the working position, the check valve 41 still retains its left-hand position; but it moves to the right, by hydrostatic action, when vacuum chamber 17''' passes the burner line 3.

In the working position of the piston 10''' in accordance with FIG. 8, oil can flow from the pump line 2 via chamber part 26''' to the burner line 3. The spring 22 then produces, by way of example, a static mechanical pressure of 2 kg/cm², opposed by a working hydraulic pressure of 5 kg/cm². Thus the piston 10''' rapidly exposes the burner line 3.

Upon switching off the pump the solenoid 49 is deactivated and the return spring 48 restores the core piston 47 which opens the bypass channel 28, 32 as seen in FIG. 9. The pressure in the chamber part 26''', derived from the residual pump pressure, then is balanced via the bypass channel, with the pressure in chamber part 27'''. By this means and by means of the return spring 22, the main piston 10''' rapidly assumes its initial position. As reduced pressure (subatmospheric) develops in the chamber part 27''', the check valve 41 moves to the left when the vacuum chamber 17''' passes the inlet of the burner line 3, and sucks a small quantity of oil from this line.

It will be seen that provision is made for connecting the burner line 3 to a fuel return line 7 and thereby to the suction side of pump 4, and to cause the sucking back of oil from line 3, through this line, by the pump suction, aided by suction in the valve chamber caused by the spring-actuated return motion of the valve piston. This sucking back occurs only while the vacuum chamber passes the connection to the burner line. Advantageously, sucking back of air or other fluid is prevented during the opening stroke of the valve piston, by a check valve or ball valve 41 in the fuel return passage or evacuation chamber 40.

It will also be seen that the ball or equivalent valve member in valve 41 changes position (from right to left and vice versa as shown) by hydrostatic effect of the pressure conditions prevailing at the two ends of channel 40, in the successive positions and operations outlined above. Various check valves are known which are open (eventually only somewhat) when their valve member is at one side, for example by using a fluted valve seat on that side, and which are closed more or less tight when on the other side. Such valves can eventually be used as valves 41. They can also be replaced by other devices; they may also be omitted.

FIGS. 2 and 3 show an embodiment of a valve conforming to the invention, directly magnet-controlled from the outside and which is highly simplified, having only one piston 50 connected to a magnet core 51 having a surrounding coil or solenoid 52. The piston 50 is guided in a bore 53 of a valve housing 54 and is provided with, for example, an annular groove 55 cooperating in the working position with the pump line or conduit 56 or burner line or conduit 57 crossing the bore 53. From the burner line there branches off an evacuation channel 58, discharging into the bore end remote from the magnet core, for the formation of a vacuum chamber 59 in housing 54. This chamber, as shown, is defined by vacuum means, provided by the walls of housing 54 at the end of the housing opposite the solenoid 52, in cooperation with piston or valve member 50. An opening stroke of the valve member, effected by the solenoid, expands the vacuum chamber; a closing return stroke restricts it.

In FIG. 2 the pump is at rest or has been switched on and a time-set preliminary blowing is occurring. The vacuum chamber is filled with air or oil from the burner line. The magnet core return spring 60 holds the transition from the pump line to the burner line.

In FIG. 6 the possible preliminary blowing time has ended, the coil 52 is energized and the piston 50 is shifted in the axial direction for the complete or partial filling-up of the vacuum chamber or cavity 59. This reduction in volume allows oil from the evacuation channel 58 to arrive in the burner line. In the working position of the piston the ring groove 55 forms the pump-burner line transition. The combustion starts without other than possible preliminary blowing delay.

Upon switching-off of the pump the piston rapidly assumes its position of rest, in order to block the transition between the said lines and by enlarging the cavity 59 sucks back a slight quantity of oil out of the burner line 57.

In accordance with a further development of this embodiment of valve (not shown), a return line with check valve is connected to the vacuum chamber. The check valve opens slightly upon piston displacement to the working position and allows a slight quantity of oil through. Also the evacuation channel 58 can have a check valve, which is closed upon piston displacement to the working position, as the embodiment described above.

In the modified valve of FIGS. 4, 5, connected to bore 153 is a return line 73 which, in the position of rest (FIG. 7), communicates with the pump line 56 via a piston overflow channel 74 which is for example U-shaped in axial section, so that the pump is never overloaded upon blocking of the burner line. Otherwise this valve corresponds to FIGS. 2, 3.

The embodiments described and shown are to be considered as illustrative and not limitative of the scope of the invention as defined within the scope of the following claims. Thus, by way of example, certain details of certain specific embodiments can also be used in other specific embodiments. Also other fields of application and for other media than oil are possible.

In the case of many of the specific embodiments shown, the pump line cross-sectional area at the valve chamber is substantially less than the valve chamber cross-section. In this connection it can be advantageous to shape the corresponding valve piston end, for example, concavely, in order to reduce the pump line working pressure, which effects the piston movement to the working position.

FIG. 4 shows that pump relief takes place from the time of pump starting until the pump line connection to the burner line and from the piston is returned to the position of rest until the complete pump shutdown. During these periods, oil circulates freely between pump line and return line.

What I claim as new and desire to secure by Letters Patent is:

1. Device for incorporation into a fuel system, comprising;
  a fuel valve having a housing defining a valve chamber, a fuel supply conduit connecting the valve chamber, in use, to a liquid fuel supply under pressure, a burner conduit connecting the valve chamber, in use, to a burner, an evacuation channel extending through the housing and connected to the burner conduit during a period when the fuel valve is being closed, a movable valve piston member disposed in the valve chamber;

electromagnetic solenoid means energized for enabling the valve piston member to perform an opening movement from a closing position of the valve piston member, wherein it closes the supply conduit, to a working position of the valve piston member, wherein it opens the supply conduit for a flow of liquid fuel from the fuel supply to the burner;

means for effecting a closing return movement of the valve piston member from the working position to the closing position upon deenergization of the electromagnetic solenoid means; and vacuum means, including a vacuum chamber disposed in the housing varied in volume by said piston valve member and increased in volume when said piston valve member returns to said closing position and connected with the evacuation chamber, for developing a low pressure in the vacuum chamber in response to the closing return movement of said piston valve member and for thereby sucking fuel back from the burner conduit during the closing return movement of the valve piston member.

2. Device for incorporation into a fuel system, comprising:

a fuel valve having a housing defining a valve chamber, a fuel supply conduit connecting the valve chamber, in use, to a liquid fuel supply under pressure, a burner conduit connecting the valve chamber, in use, to a burner, an evacuation channel extending through the housing and connected to the burner conduit during a period when the valve is being closed a movable valve piston member disposed in the valve chamber and having a solenoid energized for moving the valve piston member in an opening stroke from a closing position of the valve piston member, wherein it closes the supply conduit, to a working position of the valve piston member, wherein it opens the supply condluit for a flow of liquid fuel from the fuel supply to the burner;

means for effecting a closing return stroke of the valve member from the working position to the closing position when the solenoid is deenergized; and vacuum developing means in the housing, coacting with the valve piston member to define a vacuum chamber disposed in the housing and connected with the evacuation channel, for developing a low pressure in the vacuum chamber and thereby sucking fuel back from the burner conduit during the closing return stroke of the valve piston member.

* * * * *